United States Patent [19]

Allenspach et al.

[11] Patent Number: 5,200,936
[45] Date of Patent: Apr. 6, 1993

[54] MAGNETO-OPTIC METHOD AND APPARATUS FOR RECORDING AND RETRIEVING HIGH-DENSITY DIGITAL DATA

[75] Inventors: Rolf Allenspach, Adliswil; Andreas Bischof, Zurich, both of Switzerland

[73] Assignee: International Business Machines Corporation, Armonk, N.Y.

[21] Appl. No.: 571,796

[22] Filed: Aug. 24, 1990

[30] Foreign Application Priority Data

Jan. 9, 1990 [EP]  European Pat. Off. ........ 90810017.5

[51] Int. Cl.⁵ .................... G11B 7/135; G11B 13/04
[52] U.S. Cl. ........................................ 369/13; 360/59; 369/100; 369/110; 369/272; 365/122
[58] Field of Search .................. 360/59, 114; 365/122, 365/110, 113, 114, 118; 369/13, 275, 280, 283, 110, 112, 126, 100, 111, 272; 350/96.18; 356/376, 317; 250/306

[56] References Cited

U.S. PATENT DOCUMENTS

| | | | |
|---|---|---|---|
| 1,956,626 | 5/1934 | Robbins | 369/275.4 |
| 3,626,114 | 12/1971 | Lewicki | 360/57 |
| 4,153,328 | 5/1979 | Wang | 365/122 |
| 4,605,846 | 8/1986 | Duret et al. | 235/494 |
| 4,784,466 | 11/1988 | Khoe | 350/96.18 |
| 4,785,438 | 11/1988 | Mizunoe | 365/122 |
| 4,795,228 | 1/1989 | Schneider | 350/96.18 |
| 4,812,002 | 3/1989 | Kato | 350/96.18 |
| 4,844,580 | 7/1989 | Lynch | 350/96.18 |
| 4,868,787 | 9/1989 | Okada | 369/109 |
| 4,946,239 | 8/1990 | Garmon | 350/96.18 |
| 4,985,627 | 1/1991 | Gutierrez et al. | 250/306 |
| 5,018,865 | 5/1991 | Ferrell et al. | 356/317 X |

FOREIGN PATENT DOCUMENTS

| | | |
|---|---|---|
| 0185782 | 12/1984 | European Pat. Off. . |
| 0241007 | 10/1987 | European Pat. Off. ............ 360/114 |
| 0020747 | 2/1979 | Japan ................................ 350/96.18 |
| 0171813 | 6/1982 | Japan ................................ 360/114 |
| 0039251 | 2/1986 | Japan ................................ 369/13 |
| 0063945 | 4/1986 | Japan ................................ 369/13 |

*Primary Examiner*—Stuart S. Levy
*Assistant Examiner*—Joseph A. Rhoa
*Attorney, Agent, or Firm*—M. W. Schecter

[57] ABSTRACT

A magneto-optic method and apparatus for recording digital data employs selective heating beyond the Curie or compensation temperature $T_c$ of the record material in the presence of an external magnetic field for recording information by rotating the direction of magnetization at the affected record locations, and the selective detection of the state of rotation of the polarization direction at information storage locations in a recording medium by way of analyzing the state of rotation of the light transmitted through said record material. The writing and retrieval of information are performed by means of a sharply pointed tip placed at an essentially constant distance above the recording medium, the sharpness of the apex of said tip determining the resolution and the achievable storage density. The heating of the storage locations is accomplished by means of a laser beam directed onto the recording medium through said slidably arranged tip. For detecting the state of rotation of the polarization direction, a laser beam travelling inside a wave guide arranged in juxtaposition with said recording medium is coupled into said record layer. The light transmitted through the record layer is analyzed by said tip followed by a beam-splitting prism which provides the s- and p-polarized components of the light.

5 Claims, 1 Drawing Sheet

MAGNETO-OPTIC METHOD AND APPARATUS FOR RECORDING AND RETRIEVING HIGH-DENSITY DIGITAL DATA

BACKGROUND OF THE INVENTION

1. Field of the Invention

This invention relates to a method and apparatus for magnetooptically recording and retrieving data. For storing data, a suitable record medium is locally heated by a laser beam and cooled in the presence of an external magnetic field for changing the magnetic characteristics of the material of the record medium, and for reading data, those changes are detected with the aid of another laser beam in transmission through the record medium, by monitoring the rotation of the direction of polarization of the laser light, which rotation was caused by the recording of data.

2. Description of the Related Art

In present-day data processing, the storage of information is a key issue. Although the speed of processing the data has increased tremendously over the last decade, there is a demand for the ability to process ever larger volumes of data. The handling of large volumes of data, however, faces two related problems. The first problem is one of size: the storage facility for a large volume of data is big of necessity, and this brings about the second problem immediately, which is one of speed. The bigger the storage, the longer it takes to address the location where the desired information sits, and the longer become the paths the information has to travel from its storage location to a processing station. Obviously, storage design must strive at shrinking memory space as much as possible, in other words, aim at increasing storage density.

The highest so-far-reported data storage densities have been achieved with magneto-optic techniques. These are based on the unique properties of rare earth/transition metal thin films having a sufficiently large perpendicular anisotropy to stabilize vertical magnetic domains. The information is stored by way of selectively aligning the direction of magnetization of those domains, and the information is retrieved by monitoring the alignment of the magnetization at the selected location.

The writing of bits of information is performed by heating tiny spots of the storage medium with a well-focused high-intensity laser beam to temperatures above the Curie (or compensation) temperature $T_c$ of the material used for the storage medium, in the presence of a magnetic field. At the Curie temperature, the material loses its spontaneous or previous remanent magnetization, and its magnetic dipoles can assume the direction of an external field, which they retain after the laser beam, i.e. the source of heat, is turned off.

In prior art magneto-optic storage devices, the information is read by shining a low-intensity laser beam onto the addressed storage location and analyzing the rotation of the polarization of the reflected light induced by the magneto-optic Kerr effect. (Kerr effect is the name for the phenomenon that linearly polarized light when reflected from magnetic material becomes slightly elliptically-polarized, with the angle of rotation of the polarization direction being proportional to the magnetization.)

U.S. Pat. No. 4,823,220 describes a detector for detecting the p- and s-components of the light reflected by the magneto-optic storage medium, wherein the p- and s-components are converted from polarization rotations into a single combined-intensity modulated beam which is then intensity modulation detected for indicating the information content of the beam. In doing so, first either the p- or s-component is rotated to the s- or p-polarization plane, respectively, then the rotated and other light are processed using interferometric techniques to obtain either light or dark, which is intensity-modulated.

An interferometer particularly adapted to detect light received from a magneto-optic storage medium, i.e. reflected light which has rotated polarization caused by said storage medium, is also known from U.S. Pat. No. 4,823,220. It may include a polarization beam-splitting prism having a first face for receiving the reflected light from the medium, comprising p- and s-polarization components, and for directing these components on first and second perpendicular light paths. The first path carries the one component in a first minimal delay, the second path carries the second component in a second, equal or greater delay. The light paths are then combined for creating an interference pattern from which the optical relationship between said first and second components can be determined and converted into a modulated electrical signal carrying a representation of the stored information.

In conventional magneto-optic storage devices, the ability to provide high-density recording on optical disks requires high laser power which has been available only at comparatively long wavelengths, approximately 800 nm. To increase the recording speed, one has used 40 mW injection lasers which turned out, however, to have a limited life cycle. Semiconductor laser devices have been developed which produce shorter wavelengths, though with low efficiency, such that at 400 nm the incident power will be less than 1 mW. The shorter wavelength means, however, that the bit diameter can be cut in half, thereby increasing the density by four times.

Representative of the prior art devices making use of these considerations is the article "High-Density Optical Disk Recording System", IBM Technical Disclosure Bulletin, Vol. 31, No. 11 (1989) pp. 157–159. In accordance with the technique described in this reference, high-density recording of data is obtained by utilizing a recording head containing a 1 mW laser of 400 nm wavelength and a 5 mW laser of 800 nm wavelength. The light from both lasers passes through a common lens system designed to also serve for collecting the light reflected from the recording medium for read-out purposes. For writing information, both lasers are activated for selective cooperation with photoconductor layers provided on the storage medium.

The techniques of magneto-optic recording reported in the prior art are capable of writing domains with diameters well below the wavelength $\lambda$ (at present <200 nm) since the laser intensity can be chosen such that only the central part of the Gaussian beam profile locally heats the recording medium above its Curie or compensation temperature $T_c$ and, hence, allows switching of magnetic domains. This technique is really very efficient since a small change in laser intensity produces a small change in temperature, which—in the neighborhood of $T_c$—is sufficient to produce a large change in the magnetic anisotropy, and this determines the domain switching characteristics. In the prior art system, magneto-optic reading is, however, diffraction-limited to $\lambda/2$ because the detection uses the Kerr effect in the far-field. In fact, the achievable resolution is >1 μm (even worse), owing to the laser beam widening because of imperfections in the laser diodes and optics.

SUMMARY OF THE INVENTION

It is a purpose of the present invention to propose a modified magneto-optic data storage device which circumvents the resolution limits of the prior art.

The present invention aims at realizing this object by proposing a method for recording and retrieving data in a high-density magneto-optic data storage device comprising a rotatable recording medium, means for directing a beam of polarized light onto said recording medium for writing information into selected storage locations thereof by locally heating spots of a layer of record material of the recording medium above $T_c$ of said material in the presence of an external magnetic field, and for interrogating the data stored in said storage locations of said recording medium by means of a light beam coupled into said recording medium.

The inventive method is characterized in that the recording of data is performed by shining a beam of light (polarized or not) through a sharply pointed transparent tip onto selected locations of said recording medium while an external magnetic field is applied, and that the retrieval of the stored information is performed with the aid of an interrogating light beam coupled into a transparent structure supporting said information-carrying layer of the recording medium, transmitted through said information-carrying layer thereof, and thereby undergoing a rotation of the polarization plane, and received through the apex of said sharp tip.

The apparatus proposed in accordance with the invention is characterized in that said means for directing a beam of light (polarized or not) for writing information comprise a beam splitting prism, and a sharply pointed transparent tip in optical alignment with said prism, the apex of said tip being maintained at an essentially constant distance from the information-carrying layer of the recording medium, that said means for coupling a light beam into said storage locations for retrieving the stored information are optically connected to a transparent structure arranged in juxtaposition with said information-carrying layer, and that said tip is positionable over said storage locations of said recording medium for receiving the light transmitted through said information-carrying layer thereof.

The foregoing and other objects, features and advantages of the invention will be apparent from the following more particular description of preferred embodiments of the invention, as illustrated in the accompanying drawing.

DESCRIPTION OF THE PREFERRED EMBODIMENT

Figure 1:
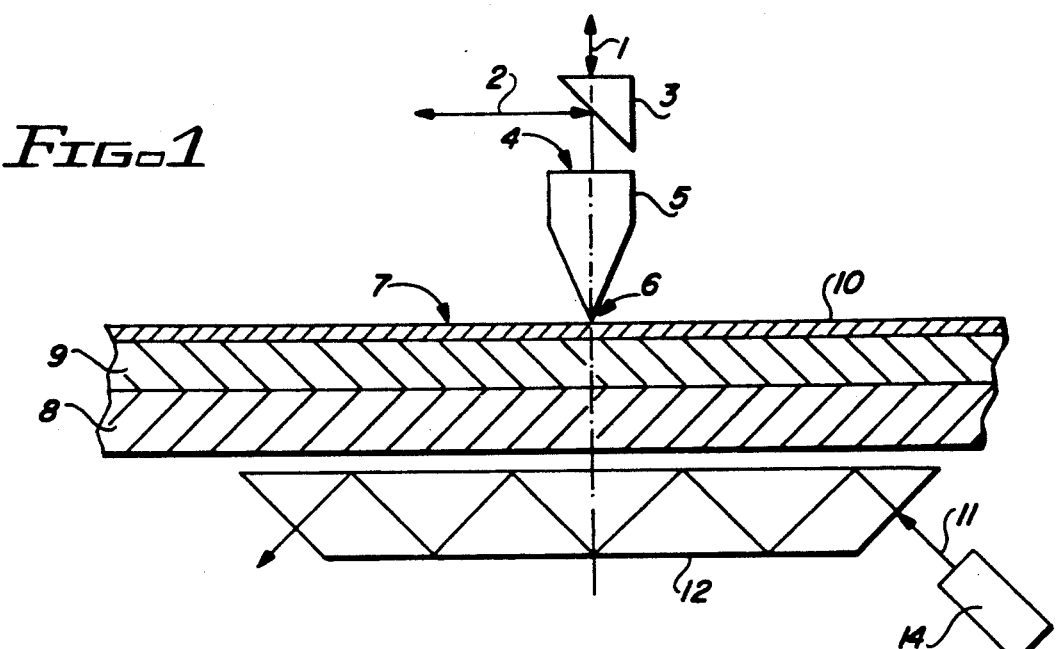
FIG. 1 is a schematic representation of the elements used in a first embodiment of the invention.

Referring now more particularly to the drawing, like numerals denote like features and structural elements in the various figures. Referring to FIG. 1, there is shown a schematic setup of a first embodiment of the invention wherein an incoming laser beam 1 (or a laser beam 2) is projected, through a polarizing beam splitter or prism 3, onto the back 4 of an optical fiber tip 5. Fiber tip 5 is transparent to the laser light; it is sharpened to an apex 6 having a diameter on the order of tens of nanometers. In place of the fiber tip, a tip made from a transparent crystal and having an opaque coating may be used. A suitable method for manufacturing such a tip is described in EP-A-0 112 402. The polarized laser light beam exits from the apex 6 of tip 5 and impinges on the recording medium 7.

Recording medium 7 consists of a substrate 8 carrying, on its surface facing tip 5, a layer 9 of magnetizable record material which, in turn, is covered with a protective coating 10. Substrate 8 and protective coating 10 are transparent to the laser light used. Thus, the laser beam exiting from the apex 6 of tip 5 will pass through coating 10 and impinge on the layer 9 of magnetizable material. At least part of the energy of the laser beam will be absorbed by layer 9 at a spot the diameter of which is defined by the diameter of the beam exiting from the apex 6 and the distance of apex 6 from layer 9, which may be assumed to be on the order of 1 μm.

The absorption of energy in layer 9 will result in heating the magnetizable material locally above $T_c$, thereby destroying the earlier magnetization and its direction at the particular storage location. Without an external magnetic field, the magnetic dipole at the location of impingement of the laser beam would assume various possible directions that are not reproducibly assignable to a digital value. Therefore, in order to set all storage locations to "0", an external magnetic field may be applied while all storage locations are heated to a temperature above the Curie temperature. As the storage material cools down, the direction of magnetization of its dipoles is maintained. For the purposes of this invention, the direction of magnetization is chosen to be normal with respect to the surface of recording medium 7.

For writing information, an external magnetic field opposite to the one used for clearing the storage is applied while selected storage locations are addressed by the laser beam for heating. In the addressed locations, and only there, the direction of magnetization is reversed, and later retained as the laser beam is turned off. The new direction may be defined as the "1"-direction.

For reading the information stored in the storage locations of medium 7, an s- or p-polarized laser beam 11 is coupled as an evanescent wave into recording medium 7 by means of a light coupling prism 12. Coupling prism 12 acts as a wave guide in which the incoming wave travels from the entrance face at one end to an absorber or exit face at the other end. The incoming laser light gets an orthogonal p- (or s-) polarized component which is proportional to the magnetization in the individual storage locations of recording medium 7. The photons and their polarization state are then probed with tip 5. In view of the fact that the diameter of the apex 6 of tip 5 is on the order of tens of nanometers, the achievable resolution is extremely good and, therefore, very high-density recording/retrieval becomes possible.

In contrast to the application of the Kerr effect as in prior art devices where the polarization state is monitored with reflected light, the invention relies on the monitoring of the polarization state with transmitted light making use of the Faraday effect. (In accordance with the Faraday effect, linearly polarized light travelling through a magnetic material becomes slightly elliptically polarized, with the angle of rotation of the polarization direction being proportional to the length of the path through the material and to the magnetization.)

The monitoring of the polarization state of the photons exiting from the upper surface of recording medium 7 is performed with a very high spatial resolution depending on the distance between the apex 6 of tip 5 and the surface of recording material layer 9. A resolution of $\lambda/30$ has already been achieved experimentally. It is to be noted that the exact value of the achievable resolution is not so important for the proposed storage scheme. Even a moderate increase in resolution by a factor of 3 (from the prior art value of 1 $\mu$m to 0.3 $\mu$m) means an increase in storage capacity by a factor of 10.

The incoming laser beam 11 does not need to be polarized. In accordance with Fresnel's theory, the total internal reflection produces an evanescent wave which is mainly p-polarized.

Figure 2:
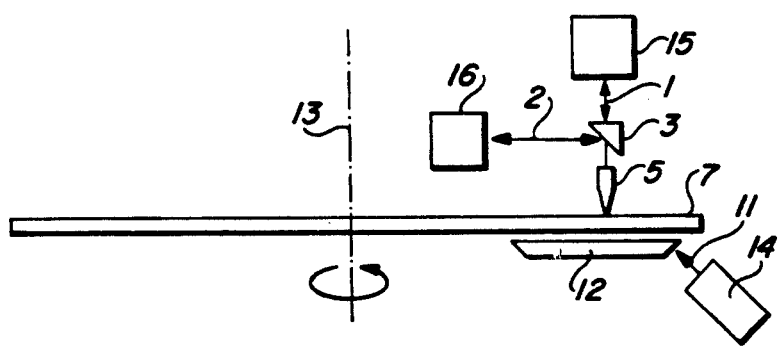
FIG. 2 is a schematic representation of a magneto-optic storage in accordance with the invention.

Referring to FIG. 2, the magneto-optic storage of the present invention comprises the recording medium 7 in the form of a disk rotatable around its axis 13 and with said coupling prism 12 mounted rigidly in close proximity underneath. A laser 14 is provided to supply a laser beam 11, and boxes 15 and 16 symbolize light detecting diodes for reading laser beams 1 and 2, respectively. Tip 5 is displaceably mounted above recording medium 7 at a constant distance. The p-polarized beam 2 may be used to construct an intensity signal to be supplied to a feedback loop for keeping the tip/surface distance constant.

At a typical distance of about 300 nm between recording medium 7 and coupling prism 12, and with a laser beam 11 coming in under an angle of 44° (compared to 43.34° for total internal reflection in quartz), the light intensity coupled into recording medium 7 still is about 40% of the total incoming laser intensity.

The angle of rotation of the polarization within the magneto-optic recording medium 7 owing to the Faraday effect is then detected by probing, with tip 5, the evanescent wave above the protective coating 10 and splitting into s- and p-polarized components with a conventional beam splitting device. For high lateral resolution, the shape of tip 5 and its distance from recording medium 7 are the important parameters. In a storage device in accordance with the invention, the flying height of tip 5 will be about 300 nm, a distance that can be maintained constant easily as in conventional (longitudinal) recording. In the presently proposed setup, the flying height is maintained constant by keeping the intensity of the detected light constant. For a flying height of 300 nm, one can expect a lateral resolution of the order of a tenth of a micrometer (or 100 nm).

Figure 3:
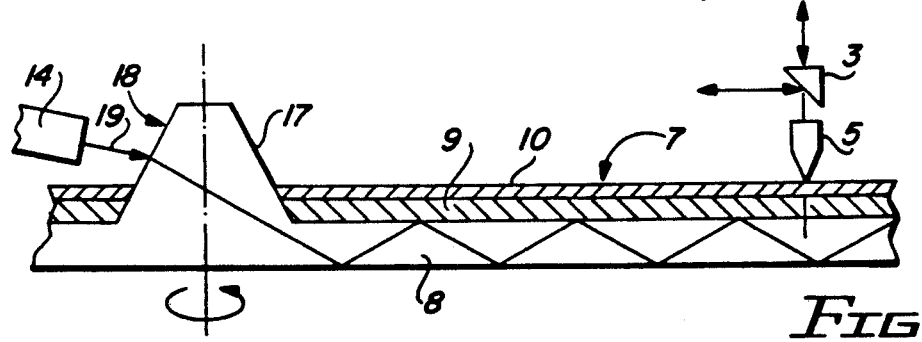
FIG. 3 shows a second embodiment of a magneto-optic storage in accordance with the invention.

An alternative arrangement for a magneto-optic data storage is shown in FIG. 3. The recording medium or disk 7 is provided with a substrate 8 having a hub 17 with an inclined flank 18 permitting a laser beam 19 to be coupled into said substrate 8. The incoming laser beam travels along substrate 8 which acts as a wave guide. Those skilled in the art will understand that this wave guide must be terminated appropriately to avoid undesired reflections.

Figure 4:
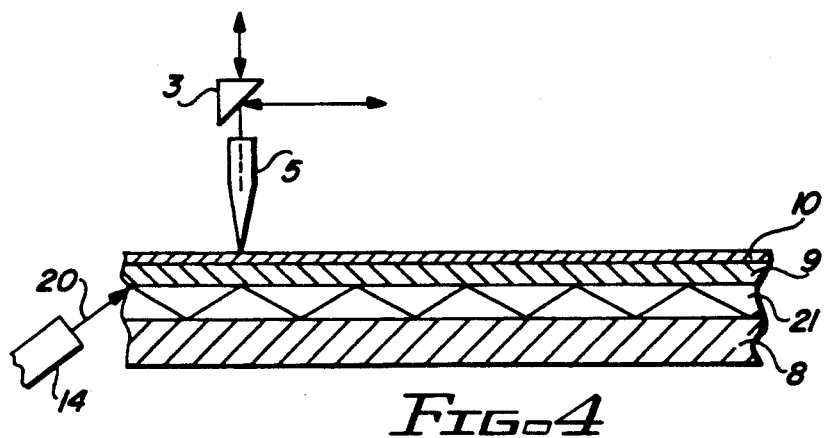
FIG. 4 shows a third embodiment of the invention.

Still another setup is shown in FIG. 4. Here, a laser beam 20 is directly coupled into an interfacial film 21 acting as an optical wave guide. Film 21 is deposited on substrate 8 and underneath record layer 9. The light wave travelling along film 21 is eventually coupled into record layer 9. The light transmitting through record layer 9 undergoes a rotation of its plane of polarization, which is detected with tip 5 and its associated analyzing means.

The arrangements in accordance with FIGS. 3 and 4 have the advantage of a better signal-to-noise ratio as compared to the setup of FIG. 1, because more light is coupled into recording medium 7 and, hence, no evanescent wave is necessary. Also, the arrangement of FIG. 1 might face the problem of having to maintain the distance between recording medium 7 and coupling prism 12 constant at <1 $\mu$m.

Given the advantageous resolution characteristics ($\lambda/30$) of the arrangement in accordance with the present invention making use of the Faraday effect, in contrast to the prior art devices using the Kerr effect (with its $\lambda/2$ limitation), it might be of interest to consider another parameter of these systems. The magnitude of the angle of rotation to be detected is $\theta_k \approx 0.3°$ for the reflected light, and for the transmitted light with a film thickness of d$\approx$50 nm it is $\theta = \theta_F * d \approx 0.5°$, i.e., the angle is similar in both cases. This must be expected from a physical point of view: The amorphous magnetizable materials used for magneto-optical recording can be deposited so thin, e.g. 50 nm, that the unavoidable reflection at the interface to the substrate 8 and to the protective layer 10 is beginning to play a more important role than the thickness of record layer 9.

In any case, a film with a thickness of 50 nm is a good choice It is thick enough for accommodating the full saturated magnetization despite the known segregation between the individual components (Segregation region thickness$\approx$10 nm), and likewise thin enough to guarantee that the lateral magnetic resolution is not affected by some averaging effect over the film thickness during the acquisition of the polarization rotation.

The materials used in connection with a magneto-optic storage device in accordance with the invention may include, for example, sapphire for the substrate 8, magnetic transition metal/rare earth compounds for the information-storing layer 9, and silicon dioxide for the protective coating 10. Suitable transition metal/rare earth compounds are, for example $Gd_xCO_{1-x}$, $Tb_xFe_{1-x}$ and $Fe_xCo_yTb_z$, etc., where $0.1<x<0.4$; $0.35<y<0.5$; and $0.15<z<0.3$. The exact stoichiometric composition will depend on the desired magnetic and optical characteristics ($T_c$, anisotropy, magnetization, magnitude of Faraday rotation). Specific examples of materials which have yielded good results are in the group comprising $Gd_{0.2}Co_{0.8}$; $Tb_{0.15}Fe_{0.85}$; and $Fe_{0.36}Co_{0.42}Tb_{0.22}$.

Although in principle for recording of information in accordance with the invention the same optical setup can be used, it might be advantageous to separate the optical paths for recording and retrieval. This can easily be accomplished through the employ of a tip having two essentially parallel optical paths which are directed at a common spot. Such a tip is described in EP-A-0 185 782.

While the invention has been particularly shown and described with reference to preferred embodiments thereof, it will be understood by those skilled in the art that various changes in form and details may be made therein without departing from the spirit and scope of the invention.

What is claimed is:

1. A method for optically retrieving data from a storage medium, the storage medium including a recording layer, the method comprising the steps of:

generating a light beam;

directing the light beam such that the light beam is initially incident upon an inclined face of a prism to transmit a light wave therein, the prism arranged at such a short distance below the storage medium so as to couple the light beam into the recording layer;

transmitting the light beam through the recording layer and then through an opening at the apex of a sharply pointed tip, wherein the sharply pointed tip provides high lateral resolution probing of the light beam; and passing the light beam through a polarization beam splitter to separate the p- and s-components thereof and detect the rotation of polarization resulting from the light beam transmitting through the recording layer.

2. A method for optically retrieving data from a storage medium, the storage medium including a recording layer, the method comprising the steps of:

generating a light beam;

directing the light beam into an inclined flank of a hub in a layer supporting the recording layer to create a light wave in the supporting layer, the supporting layer arranged beneath the storage medium so as to couple the light beam into the recording layer;

transmitting the light beam through the recording layer and then through an opening at the apex of a sharply pointed tip; and passing the light beam through a polarization beam splitter to separate the p- and s-components thereof and detect the rotation of polarization resulting from the light beam transmitting through the recording layer.

3. An apparatus for optically retrieving data from a storage medium including a recording layer, the apparatus comprising:

means for generating a light beam;

a prism arranged at such a short distance below the storage medium to couple a light wave therein into the recording layer, the prism having an inclined face therein;

a sharply pointed tip having an opening at its apex, wherein the sharply pointed top provides high lateral resolution probing of the light beam;

means for directing the light beam at the inclined face of the prism and for transmitting the light beam through the recording layer and then through an opening at the apex of the sharply pointed tip; and a polarization beam splitter to separate the p- and s-components of the light beam and to detect the rotation of polarization resulting from the light beam after it is transmitted through the recording layer.

4. An apparatus for optically retrieving data from a storage medium including a recording layer, the apparatus comprising:

means for generating a light beam;

an inclined flank of a hub in a layer supporting the recording layer, the supporting layer arranged beneath the storage medium so as to couple a light beam therein into the recording layer;

a sharply pointed tip having an opening at its apex, wherein the sharply pointed tip provides high lateral resolution probing of the light beam;

means for directing the light beam at the inclined flank of the hub and for transmitting the light beam through the recording layer and then through an opening at the apex of the sharply pointed tip; and a polarization beam splitter to separate the p- and s-components of the light beam and to detect the rotation of polarization resulting from the light beam after it is transmitted through the recording layer.

5. An apparatus for optically retrieving data from a storage medium including a recording layer, the apparatus comprising:

means for generating a light beam;

an optical wave guide layer supporting the recording layer, the wave guide layer arranged beneath the storage medium so as to couple the light beam into the recording layer;

a sharply pointed tip having an opening at its apex, wherein the sharply pointed top provides high lateral resolution probing of the light beam;

means for directing the light beam into the optical wave guide layer and for transmitting the light beam through the recording layer and then through an opening at the apex of the sharply pointed tip; and a polarization beam splitter to separate the p- and s-components of the light beam and to detect the rotation of polarization resulting from the light beam after it is transmitted through the recording layer.

* * * * *